L. FINE.
DRILL JIG.
APPLICATION FILED JUNE 7, 1918.
1,414,635.
Patented May 2, 1922.
2 SHEETS—SHEET 1.
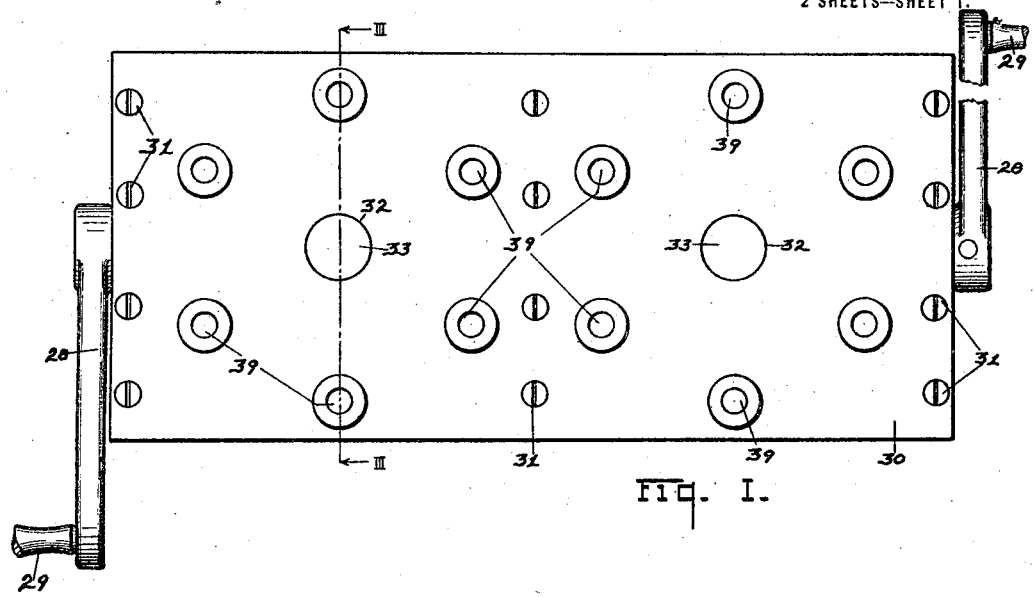
Fig. I.
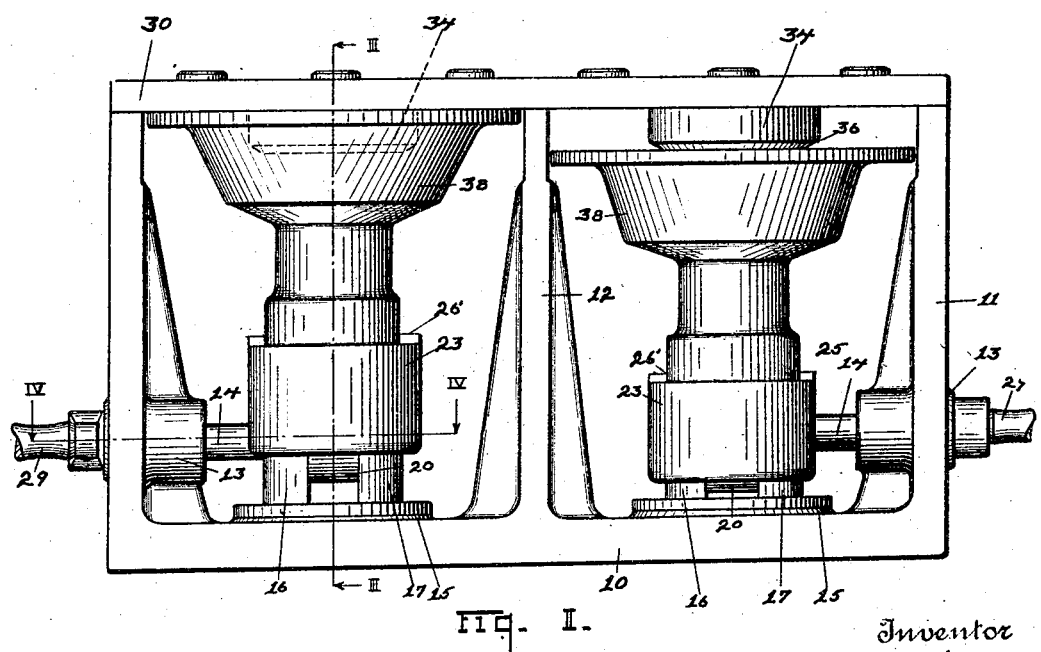
Fig. II.
Inventor
Lewis Fine
By Chester B Braselton
Attorney L. FINE.
DRILL JIG.
APPLICATION FILED JUNE 7, 1918.
1,414,635.
Patented May 2, 1922.
2 SHEETS—SHEET 2.
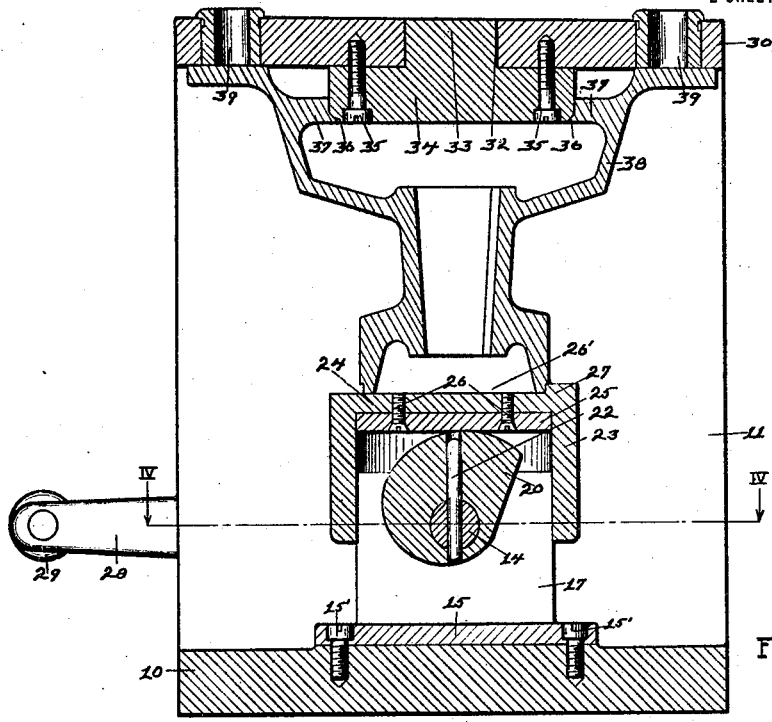
Fig. II.
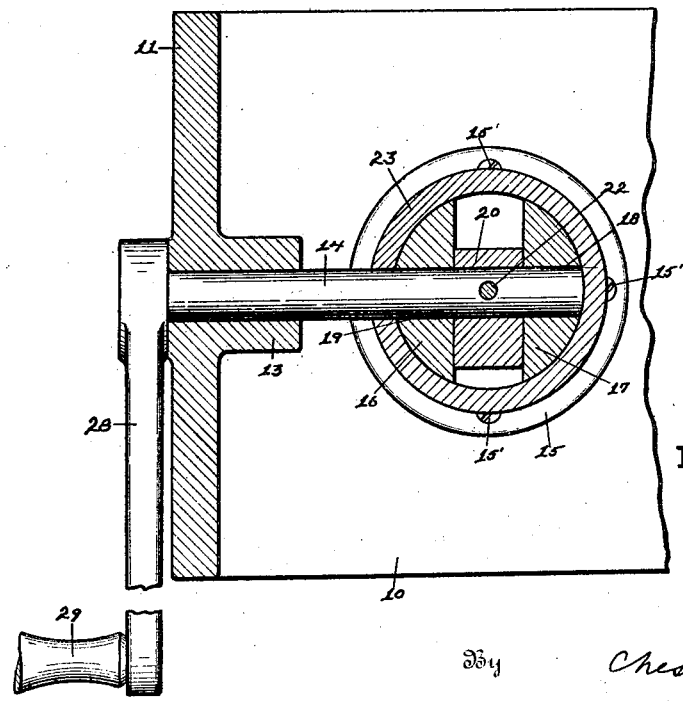
Fig. IV.
Inventor
Lewis Fine
By Chester H Braselton
Attorney

UNITED STATES PATENT OFFICE.

LEWIS FINE, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

DRILL JIG.

1,414,635.  Specification of Letters Patent.  Patented May 2, 1922.

Application filed June 7, 1918. Serial No. 238,696.

*To all whom it may concern:*

Be it known that I, LEWIS FINE, a citizen of the United States, residing at Philadelphia, in the county of Philadelphia and State of Pennsylvania, have invented certain new and useful Improvements in Drill Jigs, of which I declare the following to be a full, clear, and exact description.

This invention relates to drill jigs, and has for its primary object to provide a device whereby an inner hub of the sort commonly used on motor vehicles can be suitably positioned and held for the simultaneous drilling of brake drum holes, or for like purposes, by any form of multiple spindle drill press.

It is also a general object of the invention to provide such a device, as above characterized, which is simple in design, consisting of relatively few parts, and positive in its operation.

With the above and other objects in view, the invention consists in the novel features of construction, combination, and arrangement of parts to be hereinafter more fully described, claimed and illustrated in the following drawings, in which, Fig. I is a top plan view of the invention.

Fig. II is a side elevation of the invention showing a hub inserted but not positioned for drilling and a hub positioned for drilling.

Fig. III is a vertical cross-sectional view on the lines III—III of Figs. I and II.

Fig. IV is a horizontal sectional view taken substantially on the line IV—IV of Fig. III.

Referring to the drawings in detail, a suitable base 10 is provided, having the end pedestals or plates 11 and the central pedestal or partition 12 formed integrally therewith. In each of the end pedestals 11 there is provided a bearing 13 in which are journaled the outer ends of the shafts 14 (Figs. II and IV). A second bearing for the inner end of the shafts 14 is provided, comprising a base plate 15, which is secured to base 10 by the set screws 15' (Fig. III) and upon which is integrally formed or otherwise secured the spaced posts 16 and 17, (Figs. II–IV) said posts having the respective openings 18 and 19, which are in axial alignment with the bearings 13, and adapted for journaling the inner ends of the shafts 14. Between the posts 16 and 17 a cam member 20 is secured to each shaft 14 by a pin 22 (Figs. III and IV). A sleeve 23 has the one end 24 closed and is adapted for vertical sliding movement about the posts 16 and 17. A circular plate 25 is secured to the inner side of the closed end 24 of the sleeve 23 by set screws 26. A circular flange 27 is provided on the top surface of the closed end 24 of the sleeve 23, and a recess 26' is provided in the flange, the purpose of which will hereinafter appear. A crank 28 is secured to the outer end of cam shaft 14 and adapted for manually turning the respective shaft by the handle 29.

A plate or platform 30 is provided and secured to the tops of the outer pedestals 11 and central pedestal 12 by set screws 31 (Fig. I). In the plate 30 there is provided two central openings 32 in each of which is positioned projections 33 of circular centering plates 34 secured to the plate 30 by the set screws 35. The lower edge 36 of the centering plate 34 is rounded, adapted to engage the edge of the circular flange 37 when the rear inner hub 38 is raised, (Fig. III). Drill openings 39 (Fig. I) are provided in the plate 30 which may be of any desired number or in any desired spaced relation to each other.

In the operation of this device the inner end of a hub 38 is seated on the closed end of the sleeve 23 by sliding the outer end of the hub through the recess 26' and into the recess which is formed by the flange 27, adapted to receive the same (Figs. II and III). By rotating the shaft 14 by the crank 28 the cam member 20 engages the plate 25 and lifts the sleeve 23 and the hub 38 seated thereon. The hub 38 is properly aligned in elevated position by the co-operation of the centering plate 34 and the edge of the circular flange 36 of the hub 38 and the hub is properly seated for drilling under the openings 39 in the plate 30. With the crank 28 the shaft 14 can be manually rotated until the hub 38 is clamped between the closed end of the sleeve 23 and the plate 30. This operation may be repeated for the second hub and the hubs are then in clamped position for drilling the brake drum holes by any suitable multiple spindle drill press.

I have herein described and illustrated in the accompanying drawing the use of my invention in positioning and clamping a rear inner hub for drilling brake drum holes. However, it is to be understood that my invention is not to be so limited. The invention is susceptible of considerable variation without departing from the spirit thereof, and, therefore, I desire to claim my invention broadly, as well as specifically, as indicated in the appended claims.

Having thus described my invention, what I claim as new and desire to secure by Letters Patent, is:

1. In a device of the class described, the combination of a base; spaced pedestals on said base; a plate mounted on said pedestals and provided with spaced openings adapted for receiving the drill; spaced upright members intermediate of said pedestals; a shaft journaled in one of said pedestals and the said intermediate spaced members; a sleeve about said intermediate members and adapted for seating a hub; and co-acting means on said sleeve and shaft whereby the sleeve is raised when the shaft is rotated.

2. In a device of the class described, the combination of a base; spaced pedestals on said base; a plate mounted on said pedestals and provided with spaced openings adapted for receiving a drill; spaced upright members intermediate of said pedestals; a shaft journaled in one of said pedestals and the said intermediate spaced members; a sleeve about said intermediate members and adapted for seating a hub; a cam member secured on said shaft between said intermediate members and adapted to lift the said sleeve when the shaft is rotated; and means for centering said hub when in raised position.

3. In a device of the class described, the combination of a base; spaced pedestals on said base; a plate mounted on said pedestals and provided with spaced openings adapted for receiving a drill; spaced upright members intermediate of said pedestals; a shaft journaled in one of said pedestals and the said intermediate spaced members; a sleeve about said intermediate members and adapted for seating a hub; a cam member secured on said shaft between said intermediate members and adapted to lift the said sleeve when the shaft is rotated; and a centering member secured to the said plate in alignment with the said sleeve and adapted for centering the said hub when in its raised position.

4. In a drill jig of the class described, the combination of a base; spaced pedestals seated on said base; a plate mounted on said pedestals provided with openings adapted for receiving a drill; spaced upright members intermediate of said pedestals; a shaft journaled in one of said pedestals and the said intermediate spaced members; a cam secured to said shaft between the said intermediate members; and a sleeve about said intermediate members and having a recessed portion adapted to seat an inner hub on its upper end and to be raised by the said cam when the shaft is rotated, whereby the said hub is clamped beneath the said plate mounted on the pedestals.

5. In a device of the class described, the combination of a base, a top plate provided with a plurality of spaced openings adapted to receive a drill, a centering plate removably mounted in said top plate, a sleeve slidably mounted on said base and having an upper face on which a hub number may be seated, said upper face being provided with a flange at its edge, having a notch permitting the seating of a hub thereon by a lateral movement, a cam acting on said sleeve to move it in a direction perpendicular to said top plate, and means for actuating said cam.

6. A device of the class described comprising a base, a top plate supported above said base, a support slidably mounted on said base for movement relative thereto in a direction perpendicular to said top plate, a centering member carried by said top plate, the latter being provided with a plurality of spaced openings adapted to receive a drill and positioned around said centering member, and means for moving said support toward said top plate.

7. A device of the class described comprising a base, a top plate provided with a plurality of spaced openings adapted to receive a drill, a support slidably mounted on said base and having an upper face on which a hub member may be seated, said upper face being provided with a flange at its edge, having a notch permitting the seating of a hub thereon by a lateral movement, and means for moving said support in a direction perpendicular to said top plate.

In testimony whereof, I affix my signature.

LEWIS FINE.